US006791632B2

(12) United States Patent
Lee et al.

(10) Patent No.: US 6,791,632 B2
(45) Date of Patent: Sep. 14, 2004

(54) PROTECTION CIRCUIT AND METHOD FROM ELECTROSTATIC DISCHARGE OF TFT-LCD

(75) Inventors: Hyun-Kyu Lee, Seoul (KR); Young-Goo Kim, Chungju-Si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 11 days.

(21) Appl. No.: 10/180,979

(22) Filed: Jun. 27, 2002

(65) Prior Publication Data

US 2003/0020845 A1 Jan. 30, 2003

(30) Foreign Application Priority Data

Jul. 10, 2001 (KR) .......................... 2001-41251

(51) Int. Cl.[7] .............................. G02B 6/26; G02B 6/42
(52) U.S. Cl. ........................................................ 349/40
(58) Field of Search ........................................ 349/140

(56) References Cited

U.S. PATENT DOCUMENTS

| 5,068,748 A | | 11/1991 | Ukai et al. |
| 5,596,342 A | | 1/1997 | Ikezaki et al. |
| 5,909,035 A | | 6/1999 | Kim |
| 5,936,687 A | * | 8/1999 | Lee .............................. 349/40 |
| 6,043,971 A | * | 3/2000 | Song et al. .................. 361/111 |
| 6,088,073 A | | 7/2000 | Hioki et al. |

* cited by examiner

Primary Examiner—Richard H. Kim
(74) Attorney, Agent, or Firm—McKenna Long & Aldridge LLP

(57) ABSTRACT

An electrostatic discharge protection circuit for liquid crystal displays. The liquid crystal display includes a plurality of crossing gate and data lines on a first substrate and a data shorting line and a gate shorting line. A plurality of first ESD protection units connect the gate shorting line to the gate lines, and a plurality of second ESD protection units connect the data shorting line to the data lines. Third ESD protection units connect the gate shorting line to the data shorting line. A common electrode is formed on a second substrate. A fourth ESD protection unit directly connects the common electrode to the data shorting line.

18 Claims, 4 Drawing Sheets

PROTECTION CIRCUIT AND METHOD FROM ELECTROSTATIC DISCHARGE OF TFT-LCD

This application claims the benefit of Korean Patent Application No. 2001-41251, filed on Jul. 10, 2001, which is hereby incorporated by reference for all purposes as if fully set forth herein.

BACKGROUND OF THE INVENTION

1. Field of the Invention

The present invention relates to a circuit that protects thin film transistors (TFTs) of a liquid crystal display (LCD) device from electrostatic discharge.

2. Discussion of the Related Art

Cathode-ray tubes (CRTs) have been mainstream display devices for many applications. However, various flat panel display devices that are smaller, lighter, and consume less power have been developed. In particular, the thin film transistor liquid crystal display (TFT-LCD), which is very thin and possess excellent color characteristics, has been highly developed and has become commonplace.

Generally, a liquid crystal display device is a device for displaying images corresponding to data signals that are individually applied to pixels that are aligned in a matrix. The pixels control light transmittance to produce an image. Thus, a liquid crystal display device includes both a pixel matrix and driver integrated circuits (IC) for driving the pixels.

FIG. 1 is a cross-sectional view showing a partial cut-away view of a TFT-LCD display, and FIG. 2 is a schematic circuit diagram showing a TFT-LCD. Hereinafter, the respective components will be described with reference to the drawings.

In the TFT-Array display, a TFT substrate (the lower substrate in FIG. 1) is formed with two or more metallic layers, an insulating layer, an amorphous silicone layer, an indium-tin-oxide (ITO) layer and other required elements are deposited on a glass substrate 102 to form a TFT 107, a storage capacitor 108, a pixel electrode 104, and other structures to form an individual pixel. In addition, the TFT substrate includes data lines that interconnect multiple pixels to form a pixel matrix. Additionally, bonding pads 106 at the ends of respective data lines are used to applying data signals.

FIG. 1 also shows a color filter substrate (the upper substrate in FIG. 1) formed on a glass substrate 101. The color filter substrate includes a black matrix 109 (beneficially formed of Cr) that selectively blocks light and RGB color filters 110 over respective pixels of the TFT substrate. Additionally, an ITO thin film 103, which forms a common electrode, is deposited across the bottom of the color filter substrate.

On the substrates are alignment films 111 for aligning liquid crystal molecules in predetermined directions. The TFT and color filter substrates form a gap that is maintained uniformly by spacers 112. Liquid crystal is disposed in the gap.

An electrical connection is formed between a voltage applying terminal of the TFT substrate and the ITO thin film 103 by silver dots 114. This enables voltage to be applied to the common electrode (the ITO thin film 103).

A patterned seal 113 positioned around the circumference of the substrates functions as an adhesive that fixes the TFT-Array substrate and the color filter substrate together. The seal 113 also maintains liquid crystal between the two substrates.

Referring now to FIG. 2, on the TFT substrate 102 are a plurality of data lines for transmitting data signals applied from a data driver integrated circuit 201 to the pixels, and a plurality of gate lines for transmitting gate signals applied from a gate driver integrated circuit 202 to the pixels. The data and gate lines are formed orthogonally. Bonding pads 106 (see FIG. 1) to which the data signals and the gate signals are applied are formed at end portions of the data and gate lines. The individual pixels are positioned near the crossings of the data and gate lines.

The gate driver integrated circuit 202 applies gate signals to the plurality of gate lines such that the pixels are selected line by line, while the data signals are applied to the pixels in the selected line.

The TFTs 107 (see FIG. 1) are used as switching devices and are formed in the individual pixels. When a gate signal is applied to the gate electrode of a TFT via a gate line, a conductive channel is formed between the source and drain electrodes of the TFT. Then, an applied data signal, which is applied to the TFT drain electrode via a data line, controls the light transmittance of that pixel.

Since the glass substrates 101 and 102 are insulators, static electricity generated during the fabrication process of the TFT-Array can collect on the glass. Also, static electricity can be generated by various treatments applied to the various substrates. Such static electricity can result in electrostatic-discharge damage to the TFT-Array. Furthermore, static electricity can cause dust particles to be attracted to the glass substrate, which can contaminate the TFT-Array and the color filter array.

To reduce static electricity, the fabrication equipments and the various process used to produce a TFT LCD can be treated to minimize static electricity. However, a well-designed TFT-Array still must incorporate protection against electrostatic-discharge.

Static electricity is a particular problem because the TFT devices used in the TFT-Array are prone to static damage because the gate insulating film can be easily destroyed by relatively energy levels. Therefore, to protect the TFT-Array the induction of static electricity in the gate and data lines must be prevented. One way of doing this is to electrically short the gate signal lines and the data signal lines together. For example, if static electricity is generated between a gate line and an adjacent data line, by making the 2 lines have an equipotential damage can be prevented.

While directly connecting the gate and data lines together is efficient, such direct connections prevent electrical testing to determine breaks in signal lines or defective TFTs. Furthermore, operational tests cannot be performed. Therefore, a protection circuit that protects against electrostatic-discharge damage but enables examination of the individual pixels has been developed. That protection circuit is comprised of elements located between respective gate lines and a gate shorting line, and between respective data lines and a data shorting line. The protection circuit is illustrated in FIG. 3.

FIG. 3 shows a plurality of gate lines (G1 through G768) that are formed on a substrate 102 in a row direction. FIG. 3 also shows a plurality of data lines (D1 through D3072) that are formed on the substrate 102 in a column direction. Also shown is a gate shorting line GSL, a data shorting line DSL, and the ITO layer that forms the common electrode. The gate shorting line receives a gate low level voltage (Vgl) while the data shorting line DSL receives a common voltage (Vcom).

FIG. 3 also shows a plurality of gate line ESD protection units, GESD1 through GESD768 and GLESD1 through GLESD768, and a plurality of data line ESD protection units, DESD1 through DESD3072 and DLESD1 through DLESD3072. The gate line ESD protection units connect the front ends of the gate lines G1 through G768 to the gate shorting line GSL, while the data line ESD protection units connect the front ends of the data lines D1 through D3072 to the data shorting line DSL. Additionally, ESD protection connection units CESD1 and CESD2 connect the gate shorting line GSL to the data shorting line DSL. Finally, ESD protection induction units IESD1 and IESD2 connect the data line ESD protection units DESD1 and DESD3072 to the ITO.

When an image is being produced, a low level voltage Vgl is applied to all of the gate lines, except the gate line that is currently being driven. That driven line receives a high gate voltage that turns on the TFTs connected to that line. Thus, the gate line voltage is either Vgl or a high gate voltage. Because the protection circuit shown in FIG. 3 protects against high (static) voltages it is beneficial to connect the gate shorting line GSL to the gate low level voltage Vgl. That way, the protection devices (such as GESD1 through GESD768) are stressed by the difference between the high gate voltage and Vgl (rather then the difference between the high gate voltage and ground). If an abnormal signal, such as noise, or low level static electricity, is produced across the ESD protection unit, the ESD protection unit can conduct and impact on adjacent gate lines. Otherwise, with the gate voltage Vgl applied to the gate shorting line GSL there is no voltage across the ESD protection unit (except the one that receives the high level voltage). This stabilizes the state of the ESD protection units. Also, by applying Vcom to the data shorting line DSL the ESD protection units connected to the DSL are stabilized.

Hereinafter, the operation of the ESD protection circuit shown in FIG. 3 will be described. First, when high voltage static electricity is produced in one of the gate lines G1 through G768, the associated gate line ESD protection units GESD1 through GESD768, which are attached on the front ends of the gate lines G1 through G768, are turned on, thus dispersing static electricity to all of the gate lines by way of the gate shorting line GSL and the other ESD protection units (which act bi-directionally). Additionally, the gate line ESD protection units GLESD1 through GLESD768, which are connected to the rear ends of the gate lines G1 through G768, are turned on, thus dispersing static electricity to the gate shorting line GSL (and thus to the other gate lines). Additionally, static electricity is dispersed to the data shorting line DSL by the connection ESD protection units CESD1 and CESD2.

Charges that pass through the connection ESD protection units CESD1 and CESD2 are then dispersed via the data shorting line DSL through the induction ESD protection units IESD1 to the data lines D1~D3072 via data protection units DESD1 through DESD3072. Additionally, charges on the data shorting line DSL are dispersed to the data lines D1~D3072 through the data line ESD protection units DLESD1 through DLESD3072. The above process thus disperses charges on a gate line to all of the gate and data lines. Furthermore, since all of the protection units are bi-directional, charges on a data line are dispersed to all of the gate and data lines.

While the protection scheme shown in FIG. 3 has proven useful, problems have been found. For example, the induction ESD protection unit IESD1 essentially connects the data line ESD protection units DESD1 through DESD3072 to the connection ESD protection unit CESD1. The induction ESD protection unit IESD1 has an internal resistance. Furthermore, it has been found by experimentation that, in practice, most of the static electricity generated charges that pass through the connection ESD protection unit CESD1 are dispersed into the upper substrate (the ITO) via the Ag dot 114. This is believed to be because the upper substrate represents a lower resistance to static charges than the induction ESD protection unit IESD1. Thus, the dispersion of static electricity is less than optimal, which increases that chance of damage caused by static electricity.

Therefore, an improved ESD protection circuit would be beneficial. In particular, an improved ESD protection circuit that better distributes static electric charges into and from the data lines would be beneficial.

SUMMARY OF THE INVENTION

Therefore, an objective of the present invention is to provide an electrostatic discharge protection circuit for a TFT-LCD that more efficiently dispersing static electricity to and from gate lines and data lines.

To achieve advantages in accordance with the purpose of the present invention, as embodied and broadly described herein, there is provided an electrostatic discharge protection circuit for an LCD having a plurality of crossing gate and data lines on a substrate. The substrate further includes a data shorting line (DSL) and a gate shorting line (GSL). The substrate further includes a plurality of first ESD protection units for connecting the gate shorting line to the gate lines, a plurality of second ESD protection units for connecting the data shorting line to the data lines, third ESD protection units for connecting the gate shorting line to the data shorting line, and a common electrode on a second substrate. The protection circuit further includes a fourth ESD protection unit that directly connects the common electrode to the third ESD protection units.

The foregoing and other objectives, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an illustrated embodiment of the present invention, the example of which is shown in the accompanying drawings.

Figure 1:
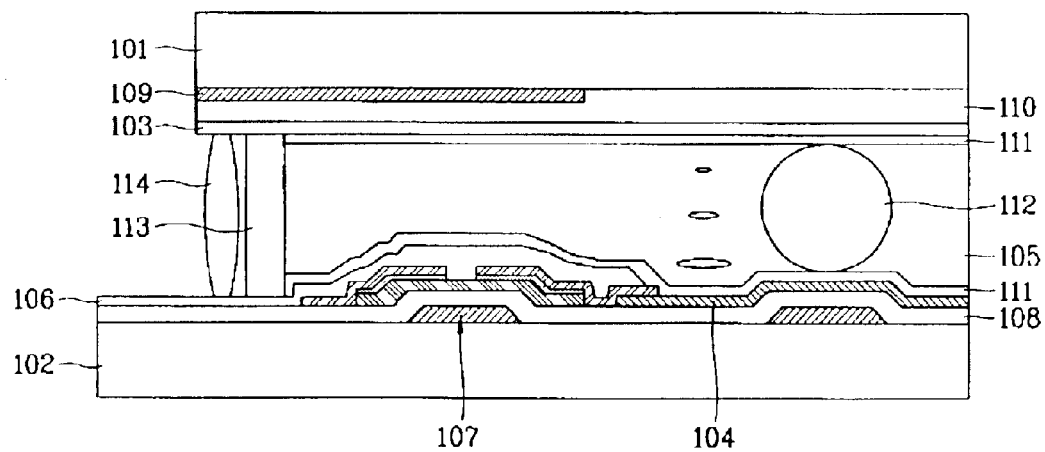
FIG. 1 is a cross-sectional view of a thin film transistor liquid crystal display (TFT-LCD) panel.
Figure 2:
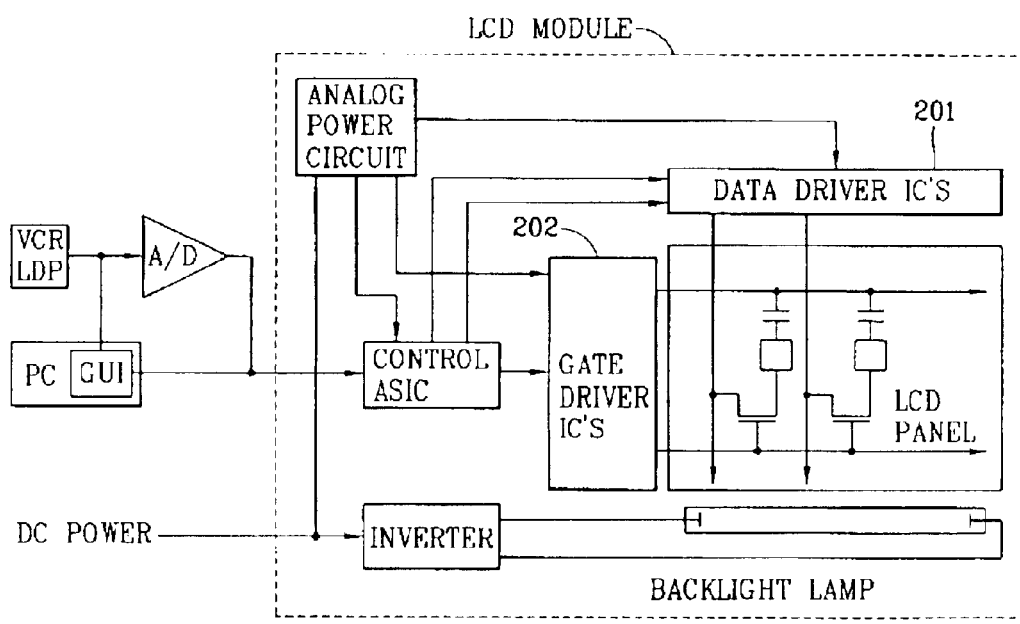
FIG. 2 is a schematic circuit diagram of a TFT-LCD.
Figure 3:
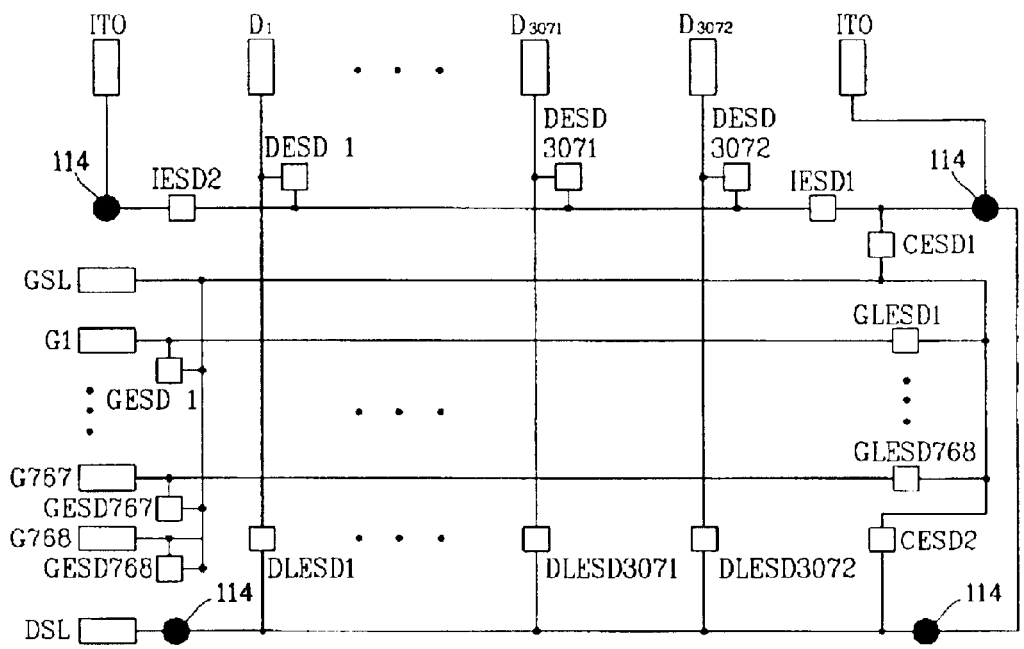
FIG. 3 is a schematic circuit diagram showing an electrostatic discharge (ESD) protection circuit that is in accord with the conventional art.
Figure 4:
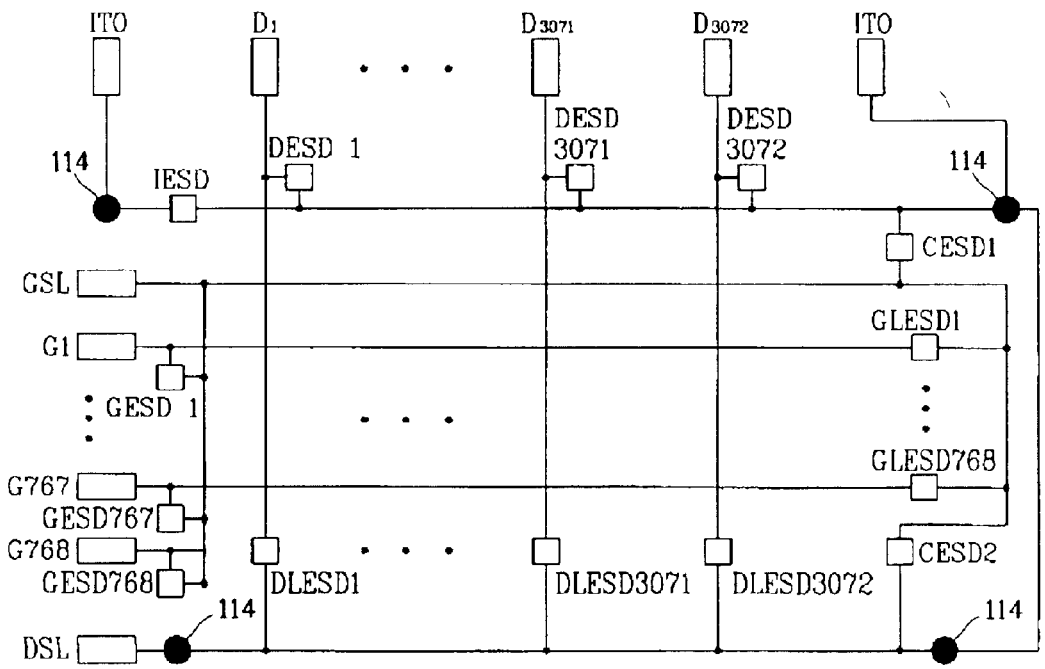
FIG. 4 is a schematic circuit diagram showing an electrostatic discharge (ESD) protection circuit that is in accord with the principles of the present invention.

FIG. 4 is a circuit diagram showing an ESD protection circuit for a thin film transistor liquid crystal display that is in accord with the principles of the present invention. For convenience, the reference numbers of FIG. 1 are used.

As shown, the ESD protection circuit includes a first substrate having plurality of gate lines, G1 through G768, and crossing data lines, D1 through D3072. The first substrate further includes a gate shorting line GSL, which receives a gate low level voltage (Vgl), and a data shorting line DSL, which receives a common voltage (Vcom). A plurality of gate line ESD protection units GESD1 through GESD768 connect the front ends of the gate lines (G1 through G768) to the gate shorting line GSL, while a plurality of gate line ESD protection units GLESD1 through GLESD768 connect the rear ends of the gate lines (G1 through G768) to the gate shorting line GSL. Furthermore, a plurality of data line ESD protection units DESD1 through DESD3072 connect the front ends of the data lines (D1 through D3072) to the data shorting line DSL, while a plurality of data line ESD protection units DLESD1 through DLESD3072 connect the rear ends of the data lines (D1 through D3072) to the data shorting line DSL.

Still referring to FIG. 4, the protection circuit further includes connection ESD protection units CESD1 and CESD2 that connect the gate shorting line GSL to the data shorting line DSL. Additionally, a common electrode ITO is formed on a second substrate. The common electrode ITO is directly connected to the connection ESD protection units CESD1 and CESD2. Additionally, an inductive protection unit IESD directly connects the common electrode ITO to the connection ESD protection units CESD1 and CESD2. In practice, a plurality of silver dots 114 are used to make connections between the common electrode, which is on the second substrate, to the connection ESD protection units CESD1 and CESD2, which are on the first substrate.

Hereinafter, the operation of the protection circuit shown in FIG. 4 will be described in detail. First, if high voltage static electricity is on a gate line, the gate line ESD protection units (one of the units GESD1 through GESD768 and one of the units GLESD1 through GLESD768) disperse charges onto the gate shorting line GSL. Furthermore, the gate line ESD protection units (GESD1 through GESD768 and GLESD1 through GLESD768) disperse charges from the gate shorting line GSL into the gate lines G1 through G768. Accordingly, static electricity is dispersed among all of the gate lines.

Furthermore, static electricity on the gate shorting line GSL is dispersed onto the data shorting line DSL by the connection ESD protection units CESD1 and CESD2. Then, static electricity dispersed onto the data shorting line DSL is dispersed into the data lines D1 through D3072 through the data line ESD protection units DESD1 through DESD3071 and the units DLESD1 through DLESD3072. Additionally, static electricity dispersed through the connection ESD protection units CESD1 and CESD2 can pass directly into the common electrode ITO or can pass directly through one inductive protection unit IESD into the common electrode ITO.

Beneficially, the charges that pass through the connection ESD protection units CESD1 and CESD2 are directly applied to the data line ESD protection units (DESD1 through DESD3071 and the units DLESD1 through DLESD3072) because the inductive protection unit IESD1 is no longer present. Experiments have shown that the inductive protection unit IESD1 used in the prior art was actually detrimental to maximizing ESD protection in that it tended to direct static electricity generated charges into the common electrode ITO.

However, by using an asymmetric structure without using an induction ESD protection unit IESD1 shown in FIG. 4 enables more stable and efficient dispersion of static electricity. Namely, the amount of static electricity that is dispersed through the data lines D1 through D3072 can be increased.

As all of the protection units are bi-directional, static electricity produced on a data line is similarly dispersed into the common electrode ITO, the data lines and the gate lines.

Figure 5:
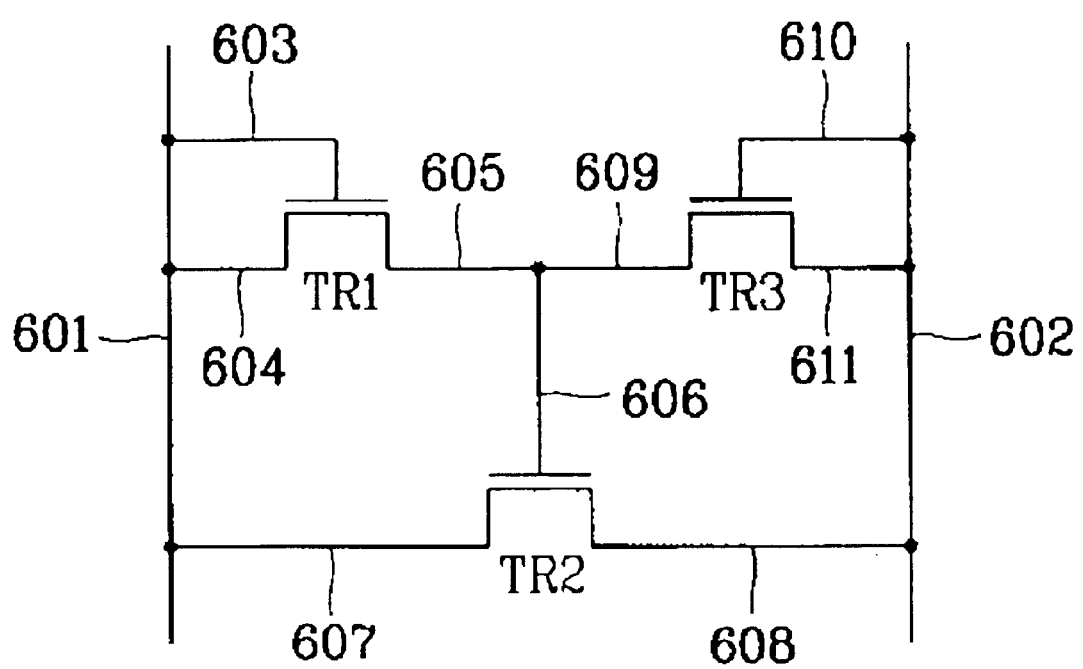
FIG. 5 is a circuit diagram showing an embodiment of an ESD protection unit used in FIG. 4.

A TFT-LCD device that operates in accord with the present invention benefits from improved resistance to static electricity produced damage. FIG. 5 is a circuit diagram showing an embodiment of an ESD protection unit. That ESD protection unit is comprised of TFT transistors that can be formed along with the TFT-Array. As shown, the ESD protection unit include a first transistor TR1 having a first gate 603 and a first source 604 that are connected to a first line 601, and a first drain 605. The ESD protection unit further includes a second transistor TR2 having a second gate 606 that is connected to the first drain 605, a second source 607 that is connected to the first line 601, and a second drain 608 that is connected to the second line 602. The ESD protection unit further includes a third transistor TR3 having a third source 609 that is connected to the first drain 605 and the second gate 606, and a third gate 610 and a third drain 611 that are connected to the second line 602.

When a voltage that is higher than the threshold voltage of the first transistor TR1 is applied to the first line 601 (such as by static electricity) the first transistor TR1 is turned on, which turns on the second transistor TR2. Therefore, the first line 601 and second line 602 are connected, forming an equipotential. When a voltage higher than the threshold voltage of the third transistor TR3 is applied to the second line 602 (such as by static electricity), the third transistor TR3 turns on, which turns on the second transistor TR2. Therefore, the first line 601 and second line 602 are connected, forming an equipotential. However, when neither the first transistor TR1 nor the third transistor TR3 are turned on, the first line 601 and second line 602 are not connected.

Figure 6:
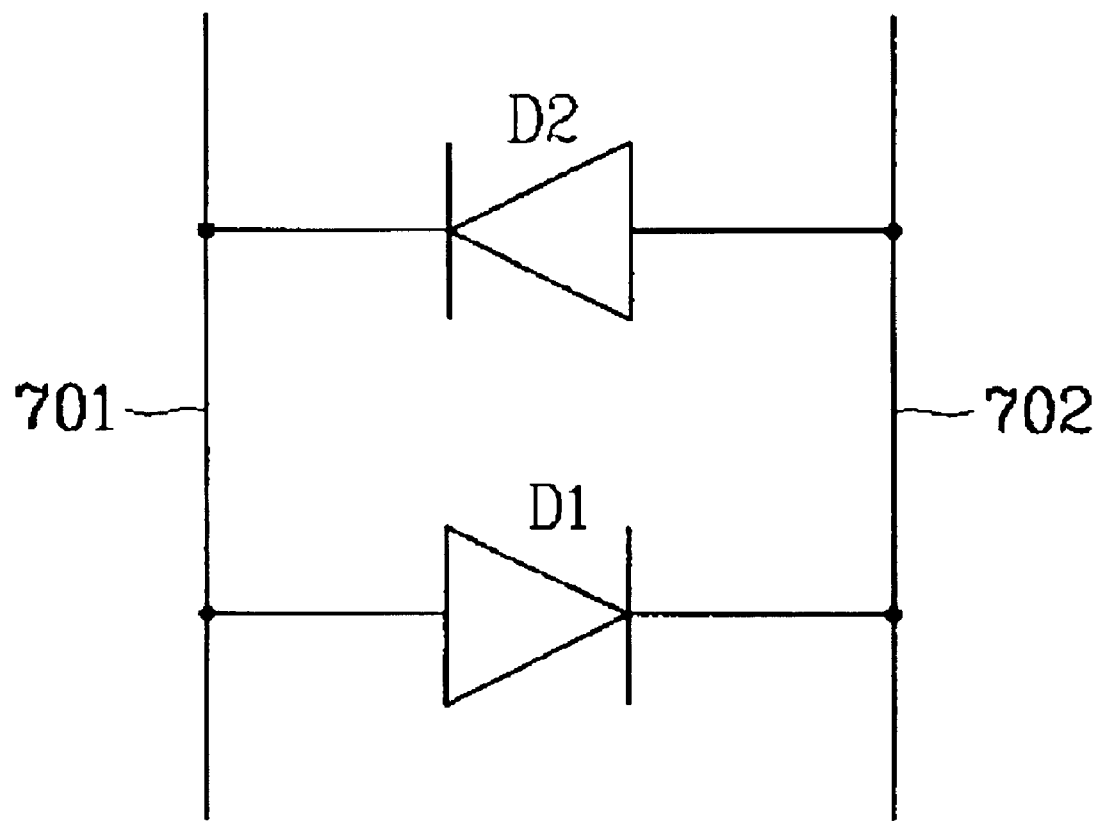
FIG. 6 is a circuit diagram showing another embodiment of an ESD protection unit used in FIG. 4.

FIG. 6 is a circuit diagram showing another embodiment of an ESD protection unit. As shown, the ESD protection unit is composed of diodes D1 and D2 which are connected in parallel between the first line 701 and the second line 702, but with opposite polarity. The diodes are not operated under normal conditions. However, when a voltage higher than the threshold voltage of the diode is applied, charges can flow between the first line 701 and the second line 702.

While two examples of ESD protection units are provided, the principles of the present invention are fully applicable with other types of ESD protection units.

A TFT display device in accordance with the present invention includes an ESD protection circuit that efficiently disperses the static electricity applied.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An electrostatic discharge protection circuit for a liquid crystal display, comprising:
   a plurality of gate lines formed on a first substrate in a row direction;
   a plurality of data lines formed on the first substrate in a column direction;
   a gate shorting line formed on the first substrate;
   a data shorting line formed on the first substrate;
   a common electrode formed on a second substrate
   a plurality of first ESD protection units connecting respective gate lines to the gate shorting line;
   a plurality of second ESD protection units connecting respective data lines to the data shorting line;
   a third ESD protection unit connecting the gate shorting line to the data shorting line; and
   a fourth ESD protection unit directly connecting the common electrode to the third ESD protection unit.

2. The circuit of claim 1, wherein the first, second, third and fourth ESD protection units are identical devices.

3. The circuit of claim 1, wherein each ESD protection unit is comprised of a plurality of transistors.

4. The circuit of claim 3, wherein each ESD protection unit includes:
   a first transistor comprised of a first gate and a first source that are connected to a first line, and a first drain;
   a second transistor comprised of a second gate that is connected to the first drain, and a second drain that is connected to a second line, and a second source that is connected to the first line; and
   a third transistor comprised of a third source that is connected to the first drain, and a third gate and a third drain that are connected to the second line.

5. The circuit of claim 1, wherein each ESD protection unit is comprised of at least two diodes.

6. The circuit of claim 5, wherein each ESD protection unit includes:
   a first diode having an anode connected to a first line and a cathode connected to a second line; and
   the second diode having a cathode connected to the first line and an anode connected to the second line.

7. The circuit of claim 1, wherein the first ESD protection units are connected in parallel with a gate shorting line.

8. The circuit of claim 1, wherein multiple ESD protection units connect each gate line to the gate shorting line.

9. The circuit of claim 1, wherein the second ESD protection units are connected in parallel with a gate shorting line.

10. The circuit of claim 1, wherein multiple ESD protection units connect each data line to the data shorting line.

11. The circuit of claim 1, wherein a gate low level voltage is applied to a gate shorting line.

12. The circuit of claim 1, wherein common voltage is applied to a data shorting line.

13. A method of protecting a liquid crystal display device from electrostatic discharge, comprising:
   dispersing static electricity between gate lines and a gate shorting line through first ESD protection units;
   dispersing static electricity between data lines and a data shorting line through second ESD protection units;
   dispersing static electricity between the gate shorting line and the data shorting line through third ESD protection units; and
   dispersing static electricity through the third ESD protection circuits directly to the second ESD protection circuits.

14. The method of claim 13, wherein the static electricity from the third ESD protection units is evenly dispersed between the data lines and the common electrode.

15. The method of claim 13, further comprising dispersing static electricity between the data shorting line and a common electrode directly through a fourth ESD protection unit.

16. A protection method for electrostatic discharge of a liquid crystal display device, comprising:
   generating static electricity in a data line;
   dispersing the static electricity to a data shorting line through an ESD protection unit that is connected to the data line;
   dispersing the static electricity from the data shorting line into all of the data lines through ESD protection units that are connected to the data shorting lines; and
   directly dispersing static electricity from between the data shorting line and a gate shorting line into a common electrode through a single ESD protection unit.

17. The method of claim 16, wherein the static electricity that passes through the data shorting line is evenly dispersed between the data lines and the common electrode.

18. A method of protecting a liquid crystal display device from electrostatic discharge, comprising the steps of:
   dispersing static electricity between gate lines and a gate shorting line through first ESD protection units;
   dispersing static electricity between data lines and a data shorting line through second ESD protection units;
   dispersing static electricity between the gate shorting line and the data shorting line through third ESD protection units; and
   evenly dispersing static electricity between the data shorting line and a common electrode that is directly connected to the data shorting line through a fourth ESD protection unit.

* * * * *